United States Patent
Al-Otaibi et al.

(10) Patent No.: US 12,444,257 B1
(45) Date of Patent: Oct. 14, 2025

(54) SYSTEMS AND METHODS FOR STORING HAZARDOUS CHEMICALS

(71) Applicant: SAUDI ARABIAN OIL COMPANY, Dhahran (SA)

(72) Inventors: Rami A. Al-Otaibi, Udhailiyah (SA); Khalid S. Ghamdi, Riyadh (SA); Faleh M. Dossary, Al Hofuf (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 270 days.

(21) Appl. No.: 18/447,900

(22) Filed: Aug. 10, 2023

(51) Int. Cl.
*G07C 9/00* (2020.01)
*G07C 9/30* (2020.01)

(52) U.S. Cl.
CPC ..... *G07C 9/00698* (2013.01); *G07C 9/00896* (2013.01); *G07C 9/00944* (2013.01); *G07C 9/30* (2020.01)

(58) Field of Classification Search
CPC .. G07C 9/00698; G07C 9/30; G07C 9/00896; G07C 9/00944
See application file for complete search history.

(56) References Cited

U.S. PATENT DOCUMENTS

| | | | | |
|---|---|---|---|---|
| 11,482,030 B2 * | 10/2022 | Ionescu | ................ | G06V 10/764 |
| 11,933,453 B2 * | 3/2024 | Swift | ................ | G06Q 10/0635 |
| 11,954,621 B2 * | 4/2024 | Daley | ................ | G06V 20/52 |
| 12,168,150 B2 * | 12/2024 | Awiszus | ................ | G07C 1/10 |
| 2010/0045464 A1 * | 2/2010 | Knopf | ................ | F16P 3/147 340/5.1 |
| 2014/0307076 A1 * | 10/2014 | Deutsch | ................ | G06V 10/56 348/77 |
| 2023/0106865 A1 * | 4/2023 | Domova | ................ | G06K 7/10386 340/815.45 |
| 2024/0185608 A1 * | 6/2024 | Alanazi | ................ | G06V 10/955 |
| 2024/0288837 A1 * | 8/2024 | Kessler | ................ | H04W 4/90 |

* cited by examiner

*Primary Examiner* — Thomas D Alunkal
(74) *Attorney, Agent, or Firm* — Osha Bergman Watanabe & Burton LLP

(57) ABSTRACT

A system for controlling a locking device of a container for storing a hazardous chemical includes a display that displays safety information relating to storage and use of the chemical, a camera that captures an image of an operator, and a controller in communication with the locking device, the display, and the camera. The controller is configured to deactivate the locking device when a request is received from the operator for physical access to the chemical, a confirmation is received that the operator has correct acknowledgement and understanding of the safety information, and a requirement for personal protective equipment relating to the chemical is determined to be satisfied based on the image.

20 Claims, 5 Drawing Sheets

SYSTEMS AND METHODS FOR STORING HAZARDOUS CHEMICALS

BACKGROUND

Hazardous chemicals are present in many workplaces in many different forms. In workplaces such as oil, gas and refined products facilities, there is always a need to minimize the risk associated with the storage, use or handling of hazardous chemicals.

There are many ways to reduce the likelihood of accidents involving hazardous chemicals and to minimize the consequences of accidents. Risk minimization depends on safe practices, appropriate engineering controls, the correct use of personal protective equipment (PPE), the use of the minimum amount of chemicals necessary and, where possible, the substitution of less hazardous chemicals. In essence, chemical safety is inextricably linked to other safety issues.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of the present disclosure, a system is provided for controlling a locking device of a container for storing a hazardous chemical. The system includes a display that displays safety information relating to storage and use of the chemical, a camera that captures an image of an operator, and a controller in communication with the locking device, the display, and the camera. The controller is configured to deactivate the locking device when a request is received from the operator for physical access to the chemical, a confirmation is received that the operator has correct acknowledgement and understanding of the safety information, and a requirement for personal protective equipment relating to the chemical is determined to be satisfied based on the image.

In another aspect of the present disclosure, a system is provided for storing a hazardous chemical. The system includes a cabinet defining a compartment with an opening. The compartment is used for storing the chemical, and the opening allows for the chemical to be moved into and out of the compartment. The system further includes a door connected to the cabinet and movable between an open position and a close position. The system further includes a locking device configured to hold the door in the close position and prevent physical access to the chemical. The system further includes a display that displays safety information relating to storage and use of the chemical, a camera that captures an image of an operator, and a controller in communication with the locking device, the display, and the camera. The controller is configured to deactivate the locking device such that the door becomes movable to the open position when a request is received from the operator for physical access to the chemical, a confirmation is received that the operator has correct acknowledgement and understanding of the safety information, and a requirement on personal protective equipment relating to the chemical is determined to be satisfied based on the image.

In a further aspect of the present disclosure, a method is provided for controlling a locking device of a container for storing a hazardous chemical. The method includes receiving a request from an operator for physical access to the chemical. The method further includes displaying safety information on the chemical. The method further includes receiving a confirmation that the operator has correct acknowledgement and understanding of the safety information. The method further includes capturing an image of the operator. The method further includes determining whether a requirement on personal protective equipment relating to the chemical is satisfied based on the image from the camera. The method further includes deactivating the locking device based on determining that the requirement on personal protective equipment relating to the chemical is satisfied.

In light of the structure and functions described above, embodiments of the disclosure may include respective means adapted to carry out various steps and functions defined above in accordance with one or more aspects and any one of the embodiments of one or more aspects described herein.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
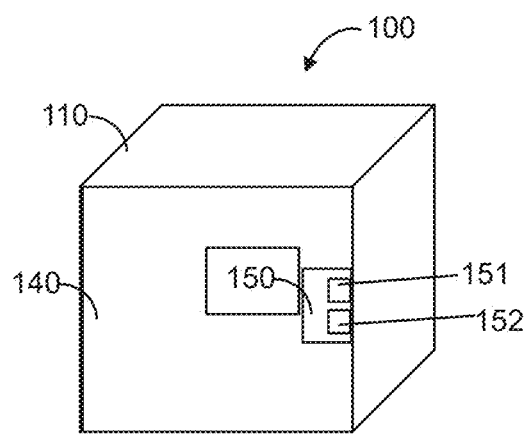
FIG. 1 is a perspective view of one or more embodiments of a hazardous chemical container with a door in a closed position.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

A review of current safety practices and the history of chemical handling incidents has shown that there are weaknesses in current safety controls such as chemical hazard awareness, chemical storage, and the use of PPE. It is believed that current measures rely primarily on human factors and are subject to human error in the storage and handling of hazardous chemicals.

It will therefore be beneficial to use engineering or work practice controls to manage or eliminate human error as much as possible.

In general, the disclosure provides a simple automated system for controlling the use of hazardous chemicals. The system combines technical controls to ensure that safety requirements are met in accordance with applicable policies before hazardous chemicals are used. The system contributes to the achievement of a safe working environment by enforcing specific safety behaviors. The disclosure also provides a simple and convenient automated procedure that minimizes human error in the handling of chemicals without introducing additional steps or requirements that may complicate or delay the performance of the activity.

The safe storage and use of hazardous chemicals is an essential part of production safety. The general concept is to prevent chemicals from causing harm to people, property, other chemicals or the environment. For example, some general requirements for chemical storage include: all chemicals must be stored in a safe, secure location; shelves should be level, stable and secured to the wall or another stable; chemicals should be stored away from direct sunlight, heat sources and escape routes; secondary containment for liquids should be provided whenever possible; containers should be labeled and compatible with the chemicals; rated storage cabinets or safety cans should be used whenever possible; and others.

It is beneficial to select an appropriate storage facility that is specifically designed for the type of hazardous chemicals being stored. In this disclosure, a storage container means any type of chemical storage facility, such as a room, a cabinet or other limited access facility. For example, a corrosive storage cabinet is designed to resist corrosion. Polyethylene cabinets are generally the most resistant, while steel cabinets have a corrosion-resistant coating and often contain polyethylene liners. Chemicals may also be stored in a safety can in a laboratory, warehouse, or other industrial settings.

Whatever the means of storage, it will be necessary and helpful to allow restricted access to the chemical. This means that only with a permit or authorization can an operator gain physical access to the chemical for further handling and use. For example, a locking system may be provided to prevent physical access to the chemical and may be deactivated to allow an operator to handle the chemical.

Figure 2:
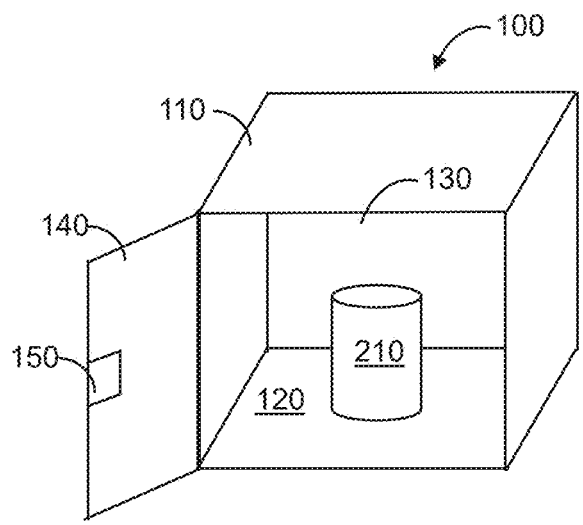
FIG. 2 is a perspective view of the hazardous chemical container of FIG. 1 with the door in an open position.

FIGS. 1 and 2 show a storage container 100 for storing a hazardous chemical 210 according to one or more embodiments. FIG. 1 shows a perspective view of the storage container 100 in a closed and locked condition, and FIG. 2 shows a perspective view of the storage container 100 in an unlocked or deactivated and open condition.

The container 100 includes a cabinet 110 having top, bottom, and side walls defining a compartment 120 for storing the chemical 210. Although only one compartment 120 is shown, it is appreciated that the compartment may have different layouts. For example, there may be a lower compartment and an upper compartment separated by a horizontal member (not shown). These compartments may be used to store hazardous chemicals, tools, and other equipment, and to house a range of electronic components associated with the storage and inventory of the chemicals. The cabinet 110 has an opening 130 to allow the chemical to be moved in and out of the compartment 120. A door 140 is connected to the cabinet 110 and is movable between an open position in which the chemical 210 is accessible and a closed position in which the chemical 210 is inaccessible. In other embodiments, the door 140 may also be a lid that forms the top wall of the cabinet 110 in a closed condition.

A locking device 150 may be provided to hold the door 140 in the closed position and prevent physical access to the chemical 210. A first lock 151 and a second lock 152 are shown with the locking device 150. However, a different number of locks may be provided with the locking device. The locking device 150 may be controlled to be deactivated or unlocked such that the door 140 becomes movable to the open position to allow access to the compartment 120 and the chemical 210 stored therein. In one embodiment, the locking device 150 may include a latch mechanism (not shown) for holding the door 140 in the closed position. The latch mechanism may be controlled to move between a latched position in which the door 140 is held in the closed position and thus the contents of the compartment are inaccessible, and an unlatched position in which the door 140 is held in the open position and the contents of the compartment are accessible. In another embodiment, the locking device 150 may be an electromagnetic lock (not shown) which uses electromagnetism to lock the door 140 when energized. An electromagnetic lock can be easily deactivated by switching off the power supply, allowing the door 140 to move to the open position. Any other type of intelligent locking device may be used in the container 100 to be controlled for automatic activation and deactivation of the door 140.

Figure 3:
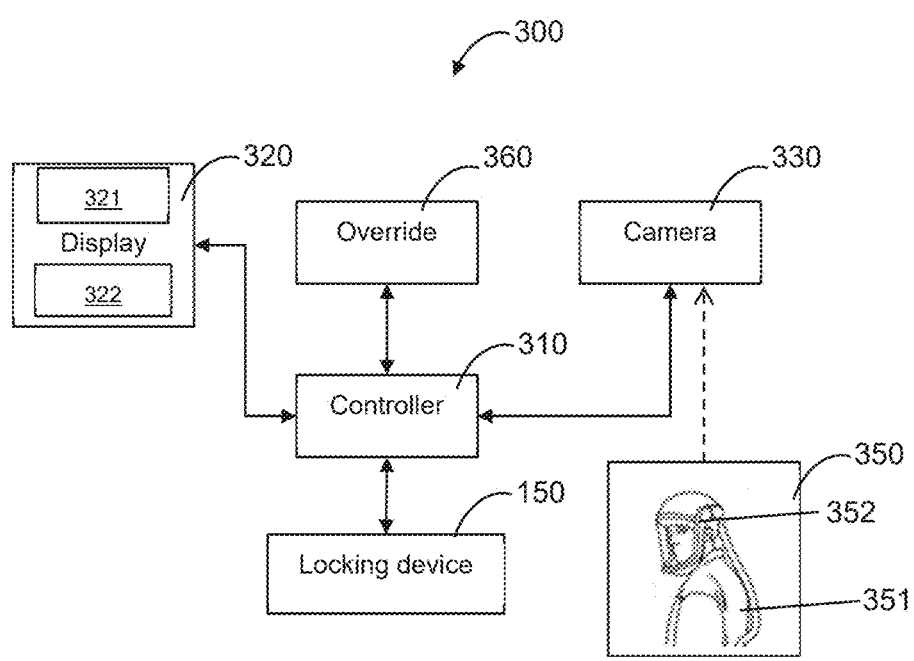
FIG. 3 is a schematic diagram of one or more embodiments of a system for controlling a locking device of a hazardous chemical container.

FIG. 3 schematically illustrates a system 300 of one or more embodiments for controlling a locking device of a hazardous chemical storage container such as that shown in FIGS. 1 and 2. The system 300 includes a controller 310, a display 320, and a camera 330. The controller 310 is in communication with the display 320 and the camera 330. The controller 310 is also in communication with a locking device 150 such as that shown in FIG. 1 and FIG. 2.

The controller 310 may be any processor-based device. As used herein, the term "processor-based device" shall refer to computers, processors, microprocessors, microcontrollers, microcomputers, programmable logic controllers, reduced instruction set (RISC) circuits, application specific integrated circuits and other programmable circuits, logic circuits, equivalents thereof, and any other circuit or processor capable of executing the functions or steps of the methods described herein.

The display 320 is used to display safety information 321 about the storage and use of the chemical. Any type of electronic display system can be used, such as digital billboards, computer monitors and digital signage, overhead projectors, tablet computers, smart phones and information devices. The display may also be provided with an input 322, such as a microphone, keyboard, touch screen and/or stylus, through which an operator can make inputs or requests to the controller 310. For example, an operator may use the input 322 to request physical access to the chemical or to confirm that the operator has correctly acknowledged and understood the safety information displayed on the display 320.

The safety information 321 may take the form of a Chemical Hazard Bulletin (CHB), Safety Data Sheet, or others. The safety information 321 may provide a standardized summary of a chemical's hazard classification, health hazards, flammability and reactivity, handling, storage and disposal, first aid information for handling hazardous chemicals, and PPE requirements. The safety information may also include any content relating to the properties, storage and use of the chemical. For example, the safety information may include the training material for an employee working with hazardous substances on storage procedures, including emergency response and spill control. As another example, the safety information 321 may include requirements for personal protective equipment to be donned by the operator.

A requirement for personal protective equipment (PPE) relating to a chemical may be listed in the safety information. PPE may include, but is not limited to, respiratory protection, eye protection such as visors, goggles, filters or shields, head protection such as hard hats, hoods or helmets, footwear, gloves, other protective clothing such as overalls and aprons, protective devices such as sensors, safety tools, detectors, global positioning devices and other appropriate equipment. Different chemicals may require different types of PPE. In addition, the appropriate donning of personal protective equipment by an operator is required to reduce potential hazards when handling hazardous chemicals.

Personal protective equipment is designed to cover vulnerable body parts or even virtually the entire human body and is adequate or sufficient to provide at least a minimum level of protection against potential hazards. In addition, the amount, type, and quality of personal protective equipment required for a particular task with a particular chemical may be found in regulations issued by government agencies such as the U.S. Department of Labor's Occupational Safety and Health Administration (OSHA). OSHA ensures safe and healthful working conditions for working men and women by setting and enforcing standards and providing training, education, outreach and assistance. OSHA requires employers to provide appropriate PPE for workers who may be exposed to blood or other infectious materials (such as bloodborne pathogens). OSHA may also require employers to provide PPE to protect against other workplace hazards.

After reading the safety information on the display, the operator can acknowledge that he or she has read and understood the safety information by entering or selecting a confirmation in the input. The operator can then be assured that they are aware of the hazards and associated requirements for the use of the chemical before being allowed access to it.

The camera 330 is used to capture one or more images 350 of an operator 351. The image 350 captured by the camera 330 is further processed to detect and identify the personal protective equipment 352 donned by the operator 351. The camera 330 can be any type of digital camera. In one or more embodiments, the camera 330 may be an AI camera capable of detecting PPE in the image as it is captured. Alternatively, the camera 330 can be configured to send the captured image 350 to another computing device, such as the controller 310, to detect and identify the PPE 352 donned by the operator 351.

The system 300 may also include an override device 360 for overriding the controller 310 and manually deactivate the lock to gain physical access to the chemical stored in a cabinet. The override device 360 may be configured to operate in response to the identity of a particular person or event and may be operated at a local level or from a remote location. For example, at the local level there may be two levels of override: local manual override and local automatic override. Local manual override requires the entry of a code or password by an individual at a user interface located at or near the container. Local automatic override requires the system to be pre-configured or pre-programmed at the local level to override the controller based on some pre-defined parameters. Examples of pre-defined parameters include, but are not limited to, the loss of power to the display 320 or the camera 330, the identity of the person seeking access, or some other similar events. Similarly, at the remote level, there may be two levels of override: remote manual override and remote automatic override. Remote manual override requires the input of a code, password or similar, or can provide an option for a manager or other authorized person to allow access and override the controller. Remote automatic override requires a control system at a remote location to be pre-programmed to override the controller 310 based on a person's identity or other factors.

Figure 4:
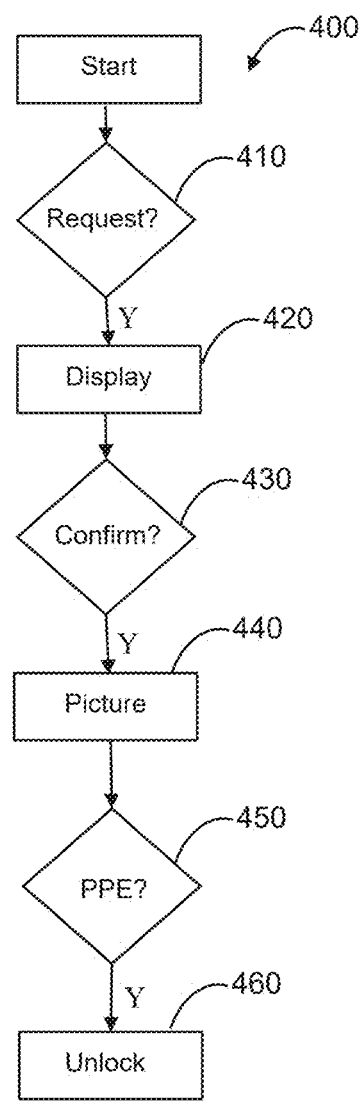
FIG. 4 is a flowchart of one or more embodiments of a method which is executable by the system shown in FIG. 3.

FIG. 4 shows a flowchart of one or more embodiments of a method 400 for the system 300 shown in FIG. 3. In particular, the method 400 may be implemented by the controller 310.

The method 400 may include a step 410: receiving a request from an operator for physical access to the chemical. When an operator wants to gain access to the compartment of the cabinet to retrieve a hazardous chemical stored therein or to store more hazardous chemicals, the operator needs to input a request, for example by inputting a request via the display or another input device. As discussed above, the input may be a microphone, keypad, touch screen, and/or stylus through which an operator can provide input to the controller.

The method 400 may further include a step 420: displaying safety information relating to the chemical. When the request is received for physical access to the chemical, the controller may control the display to show safety the safety information about the storage and use of the chemical. The safety information may include any content relating to the property, storage, and use of the chemical.

The method 400 may further include a step 430: receiving a confirmation that the operator has correct acknowledgement and understanding of the safety information. Before having access to the chemical, the operator is required to read the safety information as a training, reminder, or checklist for working with hazardous materials on storage procedures, including emergency response and spill control. In particular, the requirement on personal protective equipment relating to the chemical may be listed in the safety information, so that the operator can self-check that he or she is properly donning the personal protective equipment required for the current task involving the chemical. After reading the safety information, the operator must give a confirmation that he or she has read, understood, or self-checked the safety information. This step ensures that the operator has trained, reviewed, or implemented the associated safety measures required by the safety information.

The method 400 may further include a step 440: capturing an image of the operator. The image is used to determine whether the personal protective equipment as required for storing and handling the chemical is properly donned by the operator.

The method 400 may further include a step 450: determining that a requirement on personal protective equipment relating to the chemical is satisfied based on the image from the camera. A step of detecting personal protective equipment may be performed by the camera when the camera is provided with an appropriate system or by other processor-based devices, such as the controller.

The method 400 may further include a step 460: deactivating the locking device to allow access to the chemical stored in the cabinet when both that the confirmation is received that the operator has correct acknowledgement and understanding of the safety information and that the requirement for personal protective equipment relating to the chemical is determined to be satisfied based on the image from the camera.

Considering that an operator may accidentally forget to close the door of the cabinet, the controller may be configured to self-close the door and automatically activate the lock device after a preset period of time elapses. An alarm may also be provided such that if the door is left open after a preset period of time has elapsed, an audible or visible alarm may be sent.

Figure 5:
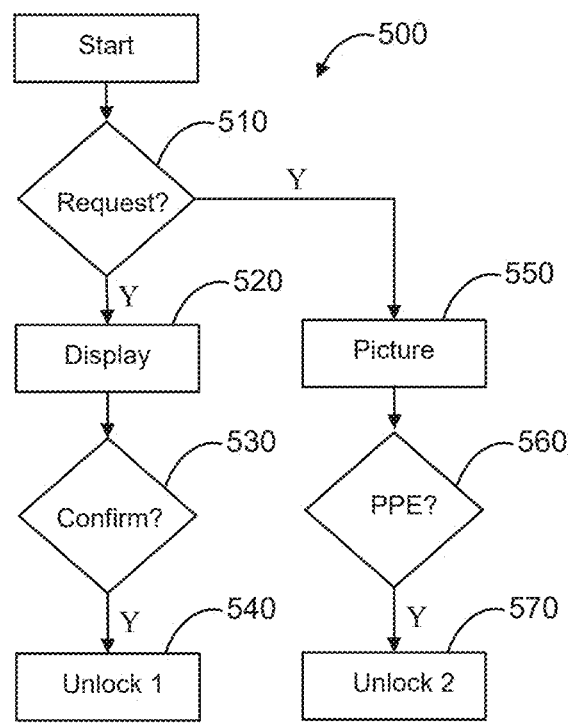
FIG. 5 is flowchart of one or more embodiments of a method which is executable by the system shown in FIG. 3.

FIG. 5 is a flowchart of one or more embodiments of a method 500 which is executable by the controller shown in FIG. 3.

In the method 500, a first lock of the locking device is deactivated when the confirmation is received that the operator has correct acknowledgement and understanding of the safety information, and a second lock is deactivated when the requirement on personal protective chemical equipment is determined to be satisfied.

In particular, after receiving a request from an operator for physical access to the chemical (step 510), the display is controlled to display safety information about the chemical (step 520). When a confirmation that the operator has correct acknowledgement and understanding of the safety information is received (step 530), a first lock of the locking device is deactivated (step 540).

Meanwhile, after receiving a request from an operator for physical access to the chemical (step 510), the camera is controlled to take an image of the operator (step 550). When the requirement on personal protective chemical equipment is determined to be satisfied based on the image (step 560), the second lock of the locking device is deactivated (step 570).

Until both the first lock and the second lock are deactivated, the locking device is deactivated and unlocked to allow the operator physical access to the chemical in the container.

Figure 6:
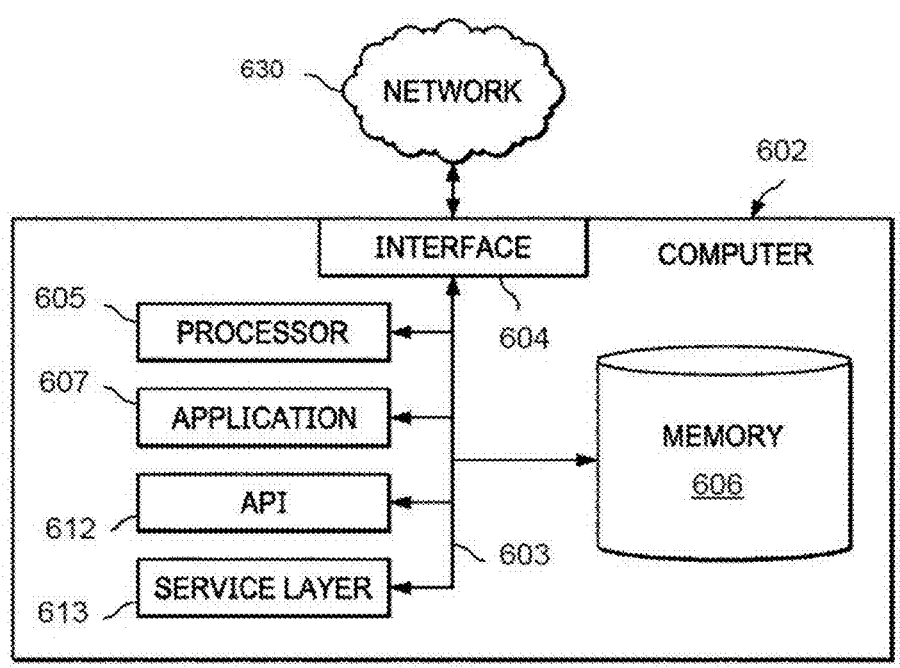
FIG. 6 shows a computer system in accordance with one or more embodiments.

The controller or any other processor-based device (such as the processor-based device of an AI camera) may be implemented with a computer system. FIG. 6 is a block diagram of a computer system 602 used to provide computational functionalities associated with described algorithms, methods, functions, processes, flows, and procedures as described in the instant disclosure, according to an implementation. The illustrated computer 602 is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable computing device, including both physical or virtual instances (or both) of the computing device. Additionally, the computer 602 may include a computer that includes an input device, such as a keypad, keyboard, touch screen, or other device that can accept user information, and an output device that conveys information associated with the operation of the computer 602, including digital data, visual, or audio information (or a combination of information), or a graphical user interface (GUI).

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing based, local, global, or other environment (or a combination of environments).

At a high level, the computer 602 is an electronic computing device operable to receive, transmit, process, store, or manage data and information associated with the described subject matter. According to some implementations, the computer 602 may also include or be communicably coupled to an application server, e-mail server, web server, caching server, streaming data server, business intelligence (BI) server, or other server (or a combination of servers).

The computer 602 can receive requests over the network 630 from a client application (for example, executing on another computer 602) and respond to the received requests by processing the said requests in an appropriate software application. In addition, requests may also be sent to the computer 602 from internal users (for example, from a command console or by other appropriate access method), external or third parties, other automated applications, as well as any other appropriate entities, individuals, systems, or computers.

Each of the components of the computer 602 can communicate using a system bus 603. In some implementations, any or all of the components of the computer 602, both hardware or software (or a combination of hardware and software), may interface with each other or the interface 604 (or a combination of both) over the system bus 603 using an application programming interface (API) 612 or a service layer 613 (or a combination of the API 612 and service layer 613). The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined business functionalities through a defined interface. For example, the interface may be software written in JAVA, C++, or other suitable language providing data in extensible markup language (XML) format or other suitable format. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems in a distributed environment that are connected to the network 630. Generally, the interface 604 includes logic encoded in software or hardware (or a combination of software and hardware) and operable to communicate with the network 630. More specifically, the interface 604 may include software supporting one or more communication protocols associated with communications such that the network 630 or the interface's hardware is operable to communicate physical signals within and outside of the illustrated computer 602.

The computer 602 includes at least one computer processor 605. Although illustrated as a single computer processor 605 in FIG. 6, two or more processors may be used according to particular needs, desires, or particular implementations of the computer 602. Generally, the computer processor 605 executes instructions and manipulates data to perform the operations of the computer 602 and any algorithms, methods, functions, processes, flows, and procedures as described in the instant disclosure.

The computer 602 also includes a memory 606 that holds data for the computer 602 or other components (or a combination of both) that can be connected to the network 630. For example, the memory 606 can be a database storing data consistent with this disclosure. Although illustrated as a single memory 606 in FIG. 6, two or more memories may be used according to particular needs, desires, or particular implementations of the computer 602 and the described functionality. While the memory 606 is illustrated as an integral component of the computer 602, in alternative implementations, the memory 606 can be external to the computer 602.

The application 607 is an algorithmic software engine providing functionality according to particular needs, desires, or particular implementations of the computer 602, particularly with respect to the functionality described in this disclosure. For example, the application 607 can serve as one or more components, modules, applications, etc. Further, although illustrated as a single application 607, the application 607 may be implemented as multiple applications 607 on the computer 602. In addition, although illustrated as integral to the computer 602, in alternative implementations, the application 607 can be external to the computer 602.

There may be any number of computers 602 associated with, or external to, a computer system containing computer 602, each computer 602 communicating over the network 630. Further, the term "client," "user," and other appropriate terminology may be used interchangeably as appropriate without departing from the scope of this disclosure. Moreover, this disclosure contemplates that many users may use one computer 602, or that one user may use multiple computers 602.

In some embodiments, the computer 602 is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A system for controlling a locking device of a container for storing a hazardous chemical, the system comprising:
   a display that displays safety information relating to storage and use of the chemical;
   a camera that captures an image of an operator; and
   a controller in communication with the locking device, the display, and the camera, wherein the controller is configured to deactivate the locking device when
      a request is received from the operator for physical access to the chemical,
      a confirmation is received that the operator has correct acknowledgement and understanding of the safety information, and
      a requirement on personal protective equipment relating to the chemical is determined to be satisfied based on the image.

2. The system of claim 1, wherein the locking device comprises:
   a first lock configured to be unlocked when the confirmation is received; and
   a second lock configured to be unlocked when the requirement on personal protective chemical equipment is determined to be satisfied.

3. The system of claim 1, wherein
   the display is further configured for the operator to input the confirmation to be sent to the controller.

4. The system of claim 1, wherein
   the controller or the camera is further configured to detect personal protective equipment in the image of the operator.

5. The system of claim 1, wherein
   the requirement on personal protective equipment is included in the safety information displayed on the display.

6. The system of claim 1, wherein
   the requirement on personal protective equipment includes that the operator dons one or more selected from a group consisting of a glove, goggles, a hat, a face shield, a flame-resistant neck protector, an ear protector, a protective suit, and a footwear.

7. The system of claim 1, wherein
   the controller is further configured to compare the personal protective equipment detected by the camera with the requirement on personal protective equipment.

8. The system of claim 1, further comprising
   an override for overriding the controller and manually deactivating the locking device to allow physical access to the chemical.

9. A system for storing a hazardous chemical, the system comprising
   a cabinet defining a compartment with an opening, the compartment being used for storing the chemical, and the opening allowing for the chemical to be moved into and out of the compartment;
   a door connected to the cabinet and movable between an open position and a close position;
   a locking device configured to hold the door in the close position and prevent physical access to the chemical;
   a display that display safety information relating to storage and use of the chemical;
   a camera that captures an image of an operator; and
   a controller in communication with the locking device, the display, and the camera, wherein the controller is configured to deactivate the locking device such that the door becomes movable to the open position when
- a request is received from the operator for physical access to the chemical;
- a confirmation is received that the operator has correct acknowledgement and understanding of the safety information; and
- a requirement on personal protective equipment relating to the chemical is determined satisfied based on the image.

10. The system of claim 9, wherein the locking device comprises:
- a first lock configured to be open when the confirmation is received; and
- a second lock configured to be open when the requirement on personal protective chemical equipment is determined to be satisfied.

11. The system of claim 9, wherein
the display is further configured for the operator to input the confirmation to be send to the controller.

12. The system of claim 9, wherein
the controller or the camera is further configured to detect personal protective equipment in the image.

13. The system of claim 9, wherein
the requirement on personal protective equipment is included in the safety information displayed on the display.

14. The system of claim 9, wherein
the controller is further configured to compare the personal protective equipment detected by the camera with the requirement on personal protective equipment relating to the chemical.

15. The system of claim 9, further comprising
an override for overriding the controller and manually deactivating the locking device to allow physical access to the chemical.

16. A method for controlling a locking device of a container for storing a hazardous chemical, the method comprising
- receiving a request from an operator for physical access to the chemical;
- displaying safety information about the chemical;
- receiving a confirmation that the operator has correct acknowledgement and understanding of the safety information;
- capturing an image of the operator;
- determining a requirement on personal protective equipment relating to the chemical is satisfied based on the image from a camera; and
- deactivating the locking device to allow for physical access to the chemical.

17. The method of claim 16, wherein deactivating the locking device comprises:
- deactivating a first lock of the locking device when the confirmation is received; and
- deactivating a second lock of the locking device when the requirement on personal protective chemical equipment is determined to be satisfied.

18. The method of claim 16, further comprising:
detecting the personal protective equipment donned by the operator.

19. The method of claim 18, further comprising:
comparing the detected personal protective equipment with the requirement on personal protective equipment relating to the chemical.

20. The method of claim 16, wherein
the requirement on personal protective equipment is included in the displayed safety information.

* * * * *